United States Patent
Rui et al.

(12) 
(10) Patent No.: US 6,287,207 B1
(45) Date of Patent: Sep. 11, 2001

(54) COUPLING ASSEMBLY

(75) Inventors: Yuting Rui, Ann Arbor; Bernardus Johannes Stapel, Dearborn Heights; Gregory Gene Page, South Lyon, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/391,275

(22) Filed: Sep. 7, 1999

(51) Int. Cl.[7] .................................................. F16D 3/06
(52) U.S. Cl. ............................................. 464/162; 74/492
(58) Field of Search .......................... 464/162; 74/492, 74/493; 248/485, 486, 487

(56) References Cited

U.S. PATENT DOCUMENTS

| | | | |
|---|---|---|---|
| 783,383 | * | 2/1905 | Olson ................................ 248/485 |
| 3,373,630 | * | 3/1968 | Heurtebise ........................... 74/492 |
| 3,482,466 | * | 12/1969 | Orlich et al. ........................ 74/492 |
| 4,009,622 | * | 3/1977 | Hinderks ............................. 74/492 |
| 5,653,146 | | 8/1997 | Barton . |
| 5,979,927 | * | 11/1999 | Hale ............................... 248/486 X |

FOREIGN PATENT DOCUMENTS

| | | | |
|---|---|---|---|
| 3723-034-A | * | 2/1988 | (DE) ..................................... 74/492 |
| 839813 | * | 6/1981 | (SU) ..................................... 74/492 |
| 1197909 | * | 12/1985 | (SU) ..................................... 74/492 |

* cited by examiner

*Primary Examiner*—Lynne H. Browne
*Assistant Examiner*—Greg Binda
(74) *Attorney, Agent, or Firm*—Ford Global Tech., Inc

(57) ABSTRACT

An assembly for coupling two selectively rotatable shafts is provided. The assembly includes a first cross-member which is fixedly coupled to the first rotating shaft, and a second cross-member which is fixedly coupled to the second shaft. A third member is pivotally coupled to the first and to the second cross-member and selectively pivots about a first axis. A fourth member is pivotally coupled to the first and to the second cross-member and pivots about a second axis which is substantially perpendicular to the first axis. The third member and the fourth member cooperate to transmit torque from the first rotating shaft to the second shaft and substantially aligns the first and second longitudinal axes of symmetry of the first and second shafts while maintaining the alignment as torque is transmitted from the first rotating shaft to the second shaft. The third and fourth members are also movable from a first collapsed position to a second expanded position, thereby allowing the first rotating shaft and the second shaft to independently move along the aligned longitudinal axes of symmetry.

7 Claims, 8 Drawing Sheets

COUPLING ASSEMBLY

(1) FIELD OF THE INVENTION

This invention relates to an assembly for coupling a pair of selectively rotatable members and more particularly, to an assembly for coupling two selectively rotatable members which allows torque to be transferred between the coupled members and which allows the coupled members to independently articulate.

(2) BACKGROUND OF THE INVENTION

Assemblies, such as automotive vehicles, often utilize various types of selectively movable and/or selectively rotatable members and require that these members or "shafts" be operatively coupled in a manner which allows the created torque or rotational energy to be communicated and/or transmitted between the coupled members and/or to other portions resident within the assembly.

For example and without limitation, an intermediate shaft is typically mounted within an automobile and is coupled to and transfers torque between the steering column and the gear shaft. Particularly, the selective rotational energy of the steering column is transferred through the intermediate shaft to the gear shaft and the wheel suspension assembly, thereby allowing the vehicle to be selectively steered.

Typically, the intermediate shaft comprises and/or represents a telescoping shaft which allows the steering column and gear shaft to be axially compliant (i.e., to selectively move "toward and away" from each other). This compliance compensates for the relative movement between the vehicle body and vehicle frame which occurs as the car is driven; absorbs and/or reduces the transmission of vibrations and/or energy generated from the vehicle's wheel suspension assembly, to the steering column; and allows the steering column to substantially and desirably "collapse" in the event of a collision or accident, thereby preventing and/or substantially reducing the probability of injury to the driver.

Another example of an "axially compliant" vehicle assembly for coupling two selectively rotatable shafts or members is a driveshaft. Particularly, a vehicle driveshaft is typically and operatively coupled to a transmission assembly and to a differential assembly and selectively transfers the transmission produced torque to the differential, thereby causing the vehicle wheels to desirably rotate. A vehicle driveshaft utilizes and/or comprises a telescoping member which selectively expands, thereby allowing the driveshaft to compensate for the relative movement between the differential and the transmission.

Although these prior assemblies effectively transmit torque between the two coupled members or shafts while allowing the members to reciprocally move with respect to each other (e.g., each of the coupled members may selectively and independently move "toward and away" from the other), they suffer from some drawbacks.

For example and without limitation, these prior telescoping members generate a relatively large amount of friction, which combined with their relatively short engagement lengths, hinders and/or slows the desired telescoping movement, generates undesirable inertial movements, and creates excessive wear and fatigue to and of the telescoping members, thereby resulting in failure, "frictional lock-up", "shock loading", and/or diminished performance. These telescoping members are further relatively highly susceptible to contamination from dirt, dust, moisture and other environmental materials, which become lodged between telescoping members.

Such contamination further causes performance degradation and/or failure of the telescoping members, thereby undesirably allowing vibrations and/or movement to be readily transferred between the coupled components, such as between the wheel suspension assembly and the steering column or between the transmission and the differential.

There is therefore a need to provide an assembly for coupling two members or shafts which overcomes at least some of the various and previously delineated drawbacks of prior coupling assemblies; which allows torque and rotational energy to be efficiently transmitted between the two coupled members or shafts; which allows each of the members or shafts to selectively and reciprocally move with respect to the other; which substantially eliminates and/or reduces frictional losses and the transfer of vibrational energy by and between the coupled members or shafts; and which allows the members or shafts to be moveable in a variety of orientations and/or positions.

SUMMARY OF THE INVENTION

It is a first object of the invention to provide an assembly for coupling two members which overcomes some or all of the previously delineated drawbacks of prior coupling assemblies.

It is a second object of the invention to provide an assembly for coupling two members which selectively transmits torque and rotation between the two coupled members, while concomitantly allowing the coupled members to selectively, independently, and reciprocally move toward and away from each other.

It is a third object of the present invention to provide an assembly for coupling two selectively rotatable shafts which substantially eliminates and/or reduces friction, and thereby substantially eliminates and/or reduces the amount of vibrational forces transferred between the coupled shafts, and substantially reduces the probability of "frictional lock up" and/or failure.

It is a fourth object of the present invention to provide an assembly for coupling two selectively rotatable shafts which allows the shafts to be moveable in a variety of directions or orientations.

According to a first aspect of the present invention, an assembly is provided for coupling a first movable member of the type which provides a first torque, to a second member. The assembly includes a first universal joint which is coupled to the first movable member; a second universal joint which is coupled to the second member; and a third member having a first portion which is coupled to the first and to the second universal joints and a second portion which is coupled to the first and to the second universal joints. The second portion cooperates with the first portion to transmit the first torque from the first member to the second member. The first and the second portions further cooperatively move from a first expanded position to a second collapsed position, thereby allowing the first member to move toward the second member as the first torque is transmitted to the second member.

According to a second aspect of the present invention, an assembly for use in combination with a first torque generating shaft and a second shaft is provided, the first and second shafts having a respective first and second longitudinal axis of symmetry. The assembly includes a first cross member fixedly coupled to the first shaft; a second cross member fixedly coupled to the second shaft; a third member which is pivotally coupled to the first and the second cross members and which selectively pivots about a first axis; and a fourth member which is pivotally coupled to the first and the second cross members and which selectively pivots about a second axis which is substantially perpendicular to the first axis. The third member and fourth member cooperate to transmit the torque which is generated by the first shaft to the second shaft, to substantially align the first and second longitudinal axes of symmetry, and to allow the third and the fourth members to move from a first collapsed position to a second expanded position, thereby allowing the first shaft and the second shaft to independently move along the aligned first and second axes of symmetry.

According to a third aspect of the present invention a method for coupling a first rotating and torque producing shaft to a second shaft is provided. The method comprises the steps of: providing a first joint; coupling the first joint to the first shaft; providing a second joint; coupling the second joint to the second shaft; providing a collapsible member having a first portion and a second portion which is substantially identical to the first portions; and coupling the first and the second portions to the first joint and to the second joint, thereby allowing at least a portion of the torque to be transferred from the first to the second shaft, while allowing the first and the second shafts to independently articulate.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1A:
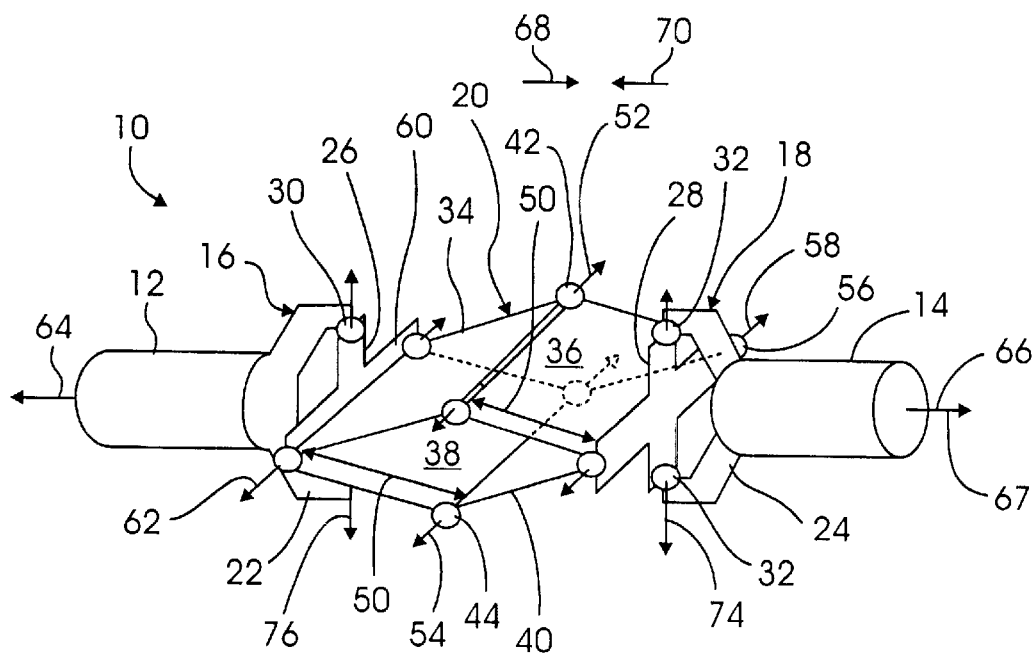
FIG. 1a is a perspective view of a coupling assembly which is made in accordance with the teachings of the preferred embodiment of the invention.
Figure 1B:
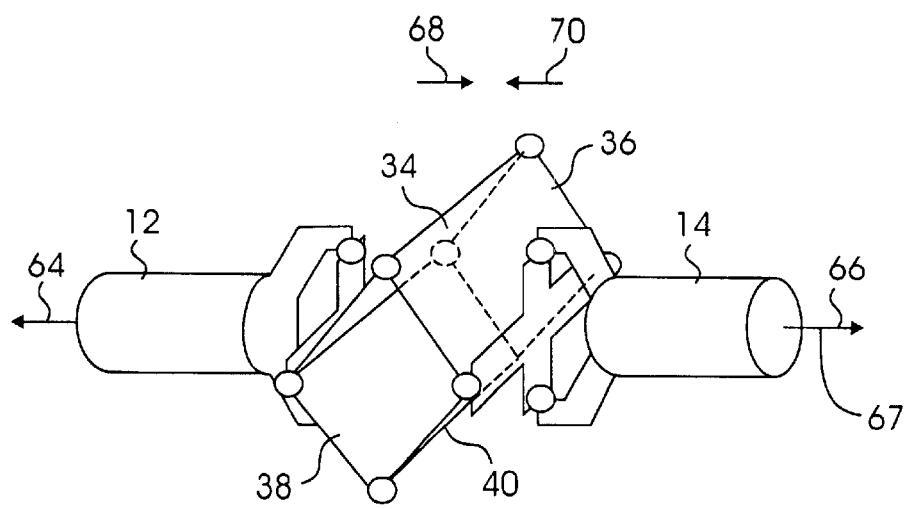
FIG. 1b is a perspective view of the coupling assembly shown in FIG. 1a in a substantially collapsed position.

Referring now to FIGS. 1a and 1b, there is shown an assembly 10 for Coupling two selectively rotatable members or shafts 12, 14 and which is made in accordance with the teachings of the preferred embodiment of the invention, which is adapted to selectively transmit and/or communicate torque between the members or shafts 12 and 14, and to selectively allow shafts 12 and 14 to selectively, reciprocally, and independently move toward and away from each other while further allowing the coupled members or shafts 12, 14 to independently and substantially articulate or travel in substantially any direction.

It should be appreciated that the assembly 10 may be selectively used within various applications requiring the coupling of two articulating members and the transmission of torque and/or rotational energy by and between these coupled members (e.g., within a steering assembly or within a vehicle drive shaft assembly). It should further be appreciated that while a pair of "shaft type" members 12, 14 are shown, assembly 10, as well as the various other coupling assemblies which are later described herein, is (are) adapted to couple other types, shapes, and/or forms of members and to provide the described coupling benefits and/or attributes to these other members. This invention should not be limited to the exact type, structure, or configuration of the described shafts 12, 14.

As shown, assembly 10 includes a first universal joint 16 which is coupled to shaft 12 in a conventional and known manner, a second universal joint 18 which is also coupled to shaft 14 in a conventional and known manner, and a connector assembly or member 20 which extends between and is operatively and pivotally coupled to universal joints 16, 18, and which cooperates with joints 16, 18 to provide many of the desired features and benefits of this invention.

Universal joints 16, 18 are, in one non-limiting embodiment, conventional and commercially available universal joints and respectively include conventional yoke members 22, 24 and conventional cross joint members or "cross joints" 26, 28 which are respectively mounted upon yokes 22, 24 by at least one substantially identical hinge pin or joint 30, 12. In one non-limiting embodiment, hinge pins 30, 32 may selectively comprise conventional and commercially available low friction bearings such as needle, ball or flexure bearings.

Member 20 includes, in one non-limiting embodiment, four substantially identical, relatively flat, and substantially square pivoting links, limbs, or members 34, 36, 38, 40, which, in the preferred embodiment of the invention, have a substantially uniform and identical respective edge length 50. It should be appreciated that members ("links") 34–40 (and all other alternate linkage members which are described within this Application) may comprise virtually any type of conventional and commercially available linking member assembly, or appendage, such as "forked" limbs, hinge plates, or any other suitable linking member which are cooperatively and selectively arranged in the described mounting configuration to provide the desired benefits and features of the invention.

Links 34, 36 are abuttingly engaged and pivotally coupled along an axis 52 by at least one hinge or joint 42. Links 38, 40 are abuttingly engaged and pivotally coupled along axis 54 by at least one hinge or joint 44. In the preferred embodiment, joints 42, 44 comprise conventional ball, needle, or flexure bearings. Unless otherwise specified, it should be understood that all of the joined or coupled members or links, which are illustrated and/or described and used within the various mounting configurations herein, are pivotally mounted or coupled in a substantially similar and conventional manner by the use of conventional low friction ball, needle flexure bearings and/or by the use of other conventional and commercially available linkage coupling mechanisms or devices.

Each pair of links 34, 36 and 38, 40 are pivotally and respectively mounted to universal joints 16, 18. Particularly, as shown, link members 36 and 40 are each pivotally mounted to opposed ends 56 of cross joint 28 in a conventional manner, thereby allowing link members 36 40 to selectively pivot about the axis 58, and link members 34 and 38 are mounted to opposed ends 60 of cross joint 26 in a conventional manner, thereby allowing link members 34, 38 to pivot about the axis 62.

In operation, universal joints 16, 18 and member 20 cooperate to transmit torque or rotational energy between a selectively rotating and torque producing one of the shafts 12, 14 and a second of the shafts 12, 14 (e.g., one of the shafts 12, 14 is typically rotated and the rotational energy or torque is communicated and/or transferred to the other shaft 12, 14), while concomitantly allowing the coupled shafts 12 and 14 to independently articulate and move in substantially any direction.

If shafts 12 and 14 are compressed or "forced together" (e.g., if a force in the direction of arrow 68 is imparted upon shaft 12 and/or a force in the direction of arrow 70 is imparted upon shaft 14), members 34–40 will selectively pivot about axes 52, 54 and 58, 62, thereby causing assembly 20 to "fold", to "collapse", or to enter into a "collapsed position." That is, as shafts 12, 14 move toward one another (e.g., for instance and without limitation along their respective longitudinal axes of symmetry 64, 66), member 20 is forced to collapse as shown in FIG. 1b. If shafts 12 and 14 are forced "apart" or away from one another (e.g., if shaft 12 is "pulled" in the direction of arrow 70 and/or if shaft 14 is "pulled" in the direction of arrow 68, members 34–40 will selectively pivot about axes 52, 54 and 58, 62, thereby causing assembly 20 to "unfold", to "expand", or to enter into an "expanded position" as shown best in FIG. 1a.

Universal joints 16, 18 allow the coupled shafts 12, 14 to independently articulate/move and/or to be independently positioned (e.g., as used in this Application the term "independently" means that one of the members 12, 14 may move or pivot without causing the other member to move or pivot) in substantially any direction. This independent articulation is achieved due to the ability of the coupled members 12, 14 to selectively and respectively pivot about axes 58 and 62 and about axes 74 and 76 of joints 16, 18. The combination of the universal joints and members/assembly 20 allows for the transfer of torque to the independently articulating shafts 12, 14 (e.g., assembly/member 20 rotates in response to a rotation of a first of the shafts 12, 14 and import the rotational energy or torque to the second of the shafts 12, 14 thereby causing the second of the shafts 12, 14 to rotate). Hence, assembly 10 may be used within applications requiring torque to be transmitted between two angularly offset or independently articulating/positioned members or shafts, such as within a vehicle steering assembly. The term "angularly offset", as used in the Application, means and/or refers to the "misalignment" of the respective longitudinal axes of symmetry of the coupled shafts or members.

In one non-limiting example, assembly 20 may selectively replace the telescoping intermediate shaft which is typically resident within a vehicle steering assembly. In this configuration, universal joints 16, 18 are respectively and operatively attached or coupled to the vehicle steering column and to the vehicle gear shaft. In this manner, the selective torque or rotational energy which is generated by the steering column is transferred and/or communicated through assembly 10 to the gear shaft. Importantly, assembly 20 allows the steering column and the gear shaft to be axially compliant (i.e., to selectively and independently move "toward and away" from each other), thereby compensating for the relative movement occurring between the vehicle body and vehicle frame while the car is driven; absorbing and/or reducing the transmission of vibrations from the wheel suspension assembly to the steering column; and allowing the steering column to selectively "collapse" in the event of a vehicle collision or accident. Hence, assembly 20 obviates the need for a telescoping intermediate shaft due to the selectively expandable attribute/characteristic/function of assembly 20. In this manner, assembly 20 substantially eliminates and/or reduces the frictional losses associated with the frictionally engaged telescoping member of prior intermediate shafts, and reduces and/or eliminates the environmental contamination produced fatigue and operational difficulties associated with such prior assemblies.

It should further be appreciated by one of ordinary skill in the art that, "at rest" (e.g., when members or shafts 12, 14 are not moving), axes 64, 66 are aligned with, overlay, and cooperatively form an axis of symmetry 67 of assembly 20. The symmetrical disposition of member 20 about this formed axis 67 (e.g., assembly 20 is symmetrical about the formed axis 67) provides "inertial balance" to member 20. Therefore, at rest, member 20 will not substantially tend to rotate and/or impart rotation to shafts/members 12, 14 through the joints 16, 18. As such, the center of gravity of member 20 lies substantially along the cooperatively formed longitudinal axis of symmetry 67. The substantial symmetry of member 20 therefore allows assembly 10 to be employed within applications requiring inertial balance (e.g., within driveshaft applications).

Figure 2:
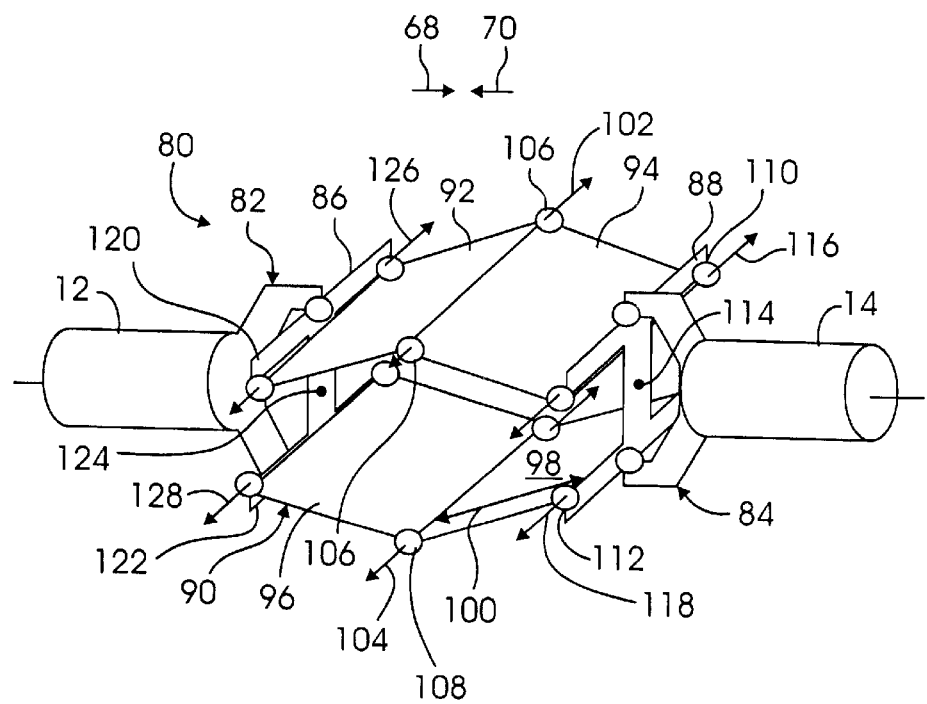
FIG. 2 is a perspective view of a coupling assembly which is made in accordance with the teachings of a second embodiment of the invention.

Referring now to FIG. 2, there is shown an assembly 80 which is made in accordance with the teachings of a second embodiment of the present invention. Particularly, assembly 80 couples the shafts 12, 14 and is adapted to transmit torque or rotational energy between the coupled shafts 12 and 14 while selectively and concomitantly allowing shafts 12 and 14 to independently articulate in substantially any direction. As shown, in assembly 80, universal joints 16 and 18 have been replaced with universal joints 82, 84, which are substantially similar in structure and function to universal joints 16, 18 with the exception that universal joints 82, 84 respectively include cross joints or "cross-portions" 86, 88 which are substantially "I"-shaped. Further, member or assembly 90 replaces assembly/member 20 of assembly 10 and includes four links, limbs, or members 92–98 which are substantially identical in structure and function to members 34–40, each having a substantially square shape with a uniform and identical edge length 100. Links 92, 94 are pivotally coupled along an axis 102 by the use of at least one hinge pin or joint 106 and links 96, 98 are pivotally coupled along axis 104 by the use of at least one hinge pin or joint 108, in a substantially similar manner as previously described with respect to links 34, 36 and links 38, 40.

Links 94 and 98 are respectively and pivotally mounted to opposed cross portions or members 110, 112 of cross joint 88 by at least one conventional pin or attachment assembly. Particularly, in the preferred arrangement, members 94, 98 are equidistantly positioned from the center of symmetry 114 of cross-joint 88. In this manner, links 94 and 98 respectively pivot about substantially parallel and coplanar axes 116 and 118 (i.e., axes 116, 118 substantially occupy the same plane). Links 92 and 96 are respectively, conventionally, and pivotally mounted to cross portions or members 120, 122 of cross joint 86 and are, more particularly, equidistantly positioned from the center of symmetry 124 of cross joint 86. In this manner, links 92 and 96 respectively pivot about substantially parallel and coplanar axes 126 and 128. In one embodiment, axes 126 and 128 are respectively parallel to axes 116 and 118 and axes 126, 116 are co-planar as are axes 128, 118. As such, assembly/member 90 is substantially symmetrical about the longitudinal axis of symmetry 115 which is aligned with the respective longitudinal axes of symmetry of shafts 12, 14. The center of gravity of assembly 90 lies along axis 115 and assembly 90 is "inertially balanced". This substantial symmetry allows assembly 80 to be employed within applications requiring inertial balance (e.g., within driveshaft applications).

Assembly 90 functions in a substantially similar manner as assembly 10. Particularly, universal joints 82, 84 and member/assembly 90 cooperatively and selectively transmit and/or communicate torque or rotational energy between the coupled members or shafts 12 and 14 while concomitantly allowing the coupled shafts 12 and 14 to independently articulate in substantially any direction. The selective "collapse" and "expansion" of member 90, in response to forces imparted upon shafts 12 and 14 in the directions of arrows 68, 70, allows shafts 12 and 14 to independently, selectively, and reciprocally move with respect to each other. Shafts 12 and 14 also respectively and independently pivot about center points 124, 114, thereby selectively and independently articulating or moving in substantially any direction. Therefore, assembly 80 is adapted for use within applications requiring the communication/transmission of torque between two angularly offset or positioned rotating shafts (e.g., between two shafts which, when rotating or moving, have respective longitudinal axes of symmetry which are not aligned), and provides substantially identical advantages over prior telescoping connector assemblies (e.g., assembly 80 substantially eliminates and/or reduces friction, and is less susceptible to contamination).

Assembly 80 also provides advantages over assembly 10 due to the manner in which assembly/member 90 is selectively mounted upon the universal joints 82, 84. Particularly, one such advantage arises from the placement of links 94 and 98 upon joint 84 at respective positions which are separated by a certain predetermined distance or length. Similarly, links 92, 96 are mounted upon joint 86 at respective positions which are separated by a predetermined distance or length. This relatively "wider" or distributed mounting arrangement provides greater or enhanced structural support to the assembly 80, over that provided within assembly 20, and provides for an improved distribution or absorption of energy or force, thereby decreasing the probability of failure or structural fatigue type inoperability or damage.

Figure 3:
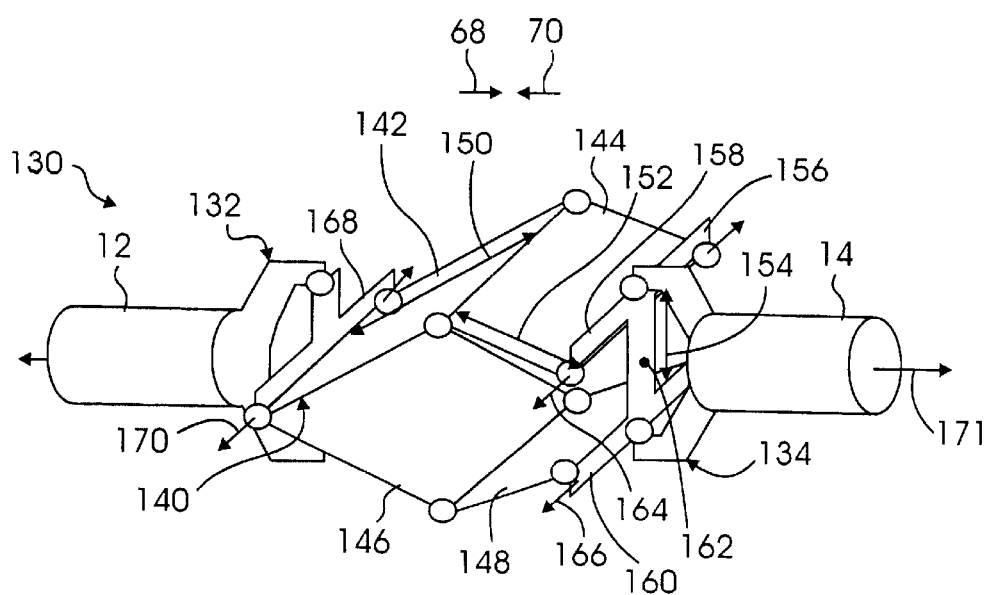
FIG. 3 is a perspective view of a coupling assembly which is made in accordance with the teachings of a third embodiment of the invention.

Referring now to FIG. 3, there is shown a coupling assembly 130 which is made in accordance with the teachings of a third embodiment of the present invention. Particularly, assembly 130 is adapted to couple shafts 12, 14 and to transmit torque or rotational energy between the couples members or shafts 12 and 14 while concomitantly allowing the coupled shafts 12 and 14 to selectively and independently articulate in substantially any direction.

As shown, assembly 130 employs universal joints 132, 134 which are respectively and substantially identical in structure and function to universal joints 16, 84. Assembly 130 further comprises an assembly or member 140 which includes four link portions, limbs, or members 142–148 which are substantially identical in structure and function to members 34–40, with the exception that members 142, 146 have a certain substantially identical and uniform edge length 150, while members 144, 148 have a different respective and substantially identical and uniform edge length 152. In the preferred embodiment of the invention, length edge 150 is equal to the value of edge length 152 plus about one half of the value of edge length 154 of cross joint 156 (i.e., length 150=length 152+(length 154/2)).

Links 142, 144 and links 146, 148 are respectively and pivotally coupled and mountably arranged in a substantially similar manner as previously described with respect to links 34, 36 and links 38, 40. Further, links 144 and 148 are respectively and pivotally mounted to opposed portions 158, 160 of cross joint 156 in a conventional manner and are equidistantly positioned from the point of symmetry 162 or "cross center" point of universal joint 134. In this manner, links 144 and 148 selectively and respectively pivot about substantially parallel and coplanar axes 164 and 166. Links 142 and 146 are respectively and pivotally mounted to cross joint 168, in a conventional manner, along axis 170 and selectively pivot about the same axis 170. Member 130 is substantially symmetrical about the longitudinal axis of symmetry 171 which passes through the stationary shafts 12, 14. Member 130 is therefore inertially balanced, thereby allowing assembly 130 to be employed within applications requiring inertial balance (e.g., within driveshaft applications).

Assembly 130 functions in a substantially similar manner as assemblies 10 and 80 (e.g., universal joints 132, 134 and member 140 cooperate to transmit torque or rotational energy between shafts 12 and 14 while allowing shafts 12 and 14 to independently and concomitantly articulate with respect to each other in substantially any direction). Further, as previously described with respect to members or assemblies 20, 90, the selective "collapse" and "expansion" of member or assembly 140, in response to forces imparted upon shafts 12 and 14 in the directions of arrows 68, 70, allows shafts 12 and 14 to selectively, independently, and reciprocally move "toward and away" from each other as the torque and/or rotational energy is communicated between the coupled shafts 12, 14. Assembly 130 is therefore adapted for use within applications requiring torque or rotational energy to be transmitted between two angularly offset rotating shafts (e.g., within a steering assembly). It should be appreciated that assembly 130 combines many of the features of assemblies 10 and 80 and particularly provides improved inertial stability over assembly 10 due to the relatively large distance separating the mounted portions of links 142–148, while providing a greater range of movement between shafts 12, 14 than assembly 80.

Figure 4:
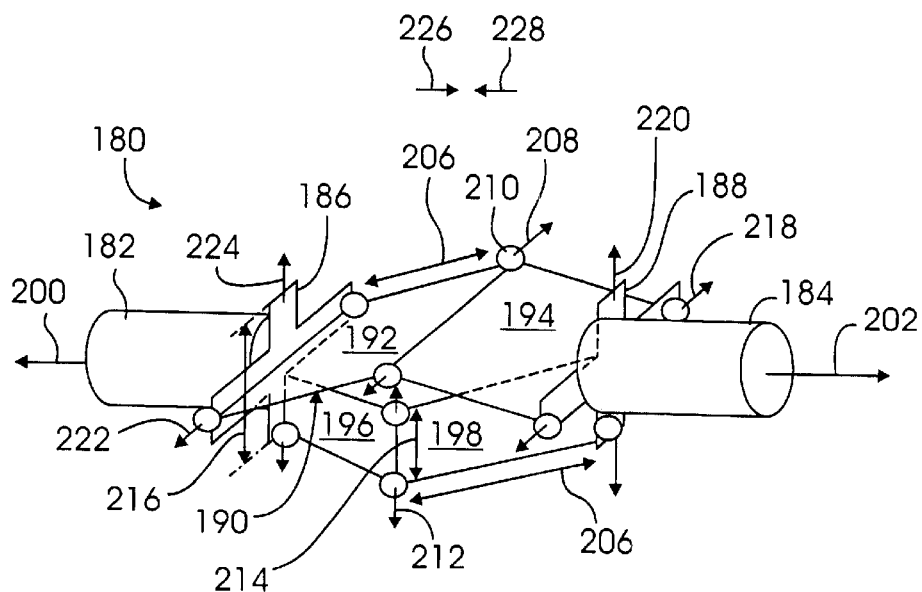
FIG. 4 is a perspective view of a coupling assembly which is made in accordance with the teachings of a fourth embodiment of the invention.

Referring now to FIG. 4, there is shown a coupling assembly 180 which is made in accordance with the teachings of a fourth embodiment of the invention and which is adapted to couple shafts 12, 14, to selectively transmit and/or communicate torque or rotational energy between the coupled shafts or members 182 and 184, and to selectively and concomitantly allow members 182 and 184 to move toward and away from each other while substantially preventing any relative angular movement between portions 182, 184 (e.g., maintaining the alignment between the longitudinal axis of symmetry 200 of the member 182 and the longitudinal axis of symmetry 202 of the member 184).

As shown, assembly 180 includes a first cress member 186 which is conventionally and fixedly coupled to shaft 182, a second cross member 188 which is conventionally and fixedly coupled to shaft 184, and a connector assembly or member 190 which extends between and is operatively coupled to cross members 186, 188. In the preferred embodiment of the invention, shafts 182, 184 have respective longitudinal axes of symmetry 200, 202 which substantially "overlap", "coincide", or are "aligned'8, thereby cooperatively forming a longitudinal axis of symmetry.

Member 190 includes a first pair of links, limbs, or members 192, 194 which are substantially identical in structure and function to members 34, 36 and which each have a substantially uniform and identical edge length 206.

Links 192, 194 are pivotally coupled along an axis 208 by the use of at least one hinge pin or joint 210. A second pair of links 196, 198 are pivotally coupled along axis 212, which in substantially perpendicular to axis 208, by the similar use of at least one hinge pin or joint. Links 196, 198 each have an edge length 206 which is substantially identical to the edge length of links 192, 194, and further has a "height" 214 which is equal to approximately one half of the "height" 216 of cross members 186, 188.

As shown in FIG. 4, links 196, 198; and links 192, 194 are pivotally and respectively coupled to cross members 186, 138. In this manner, links 194 and 198 respectively and selectively pivot about substantially perpendicular and coplanar axes 218 and 220, and links 192 and 196 respectively and selectively pivot about substantially perpendicular and coplanar axes 222 and 224. Axes 218 and 220 reside in a plane parallel to the plane in which axes 222 and 224 reside. The previously described mounting of link pair 192, 196 and the fixed attachment of shafts 182, 184 to cross members 186, 188, substantially ensures that shafts 182 and 184 do not move angularly with respect to one another (e.g., axes 200, 202 remain operatively aligned in the manner shown). Hence, shaft 182, 184 are limited to only relative axial motion which is described below, along the aligned axes 200, 202.

In operation, member 190 and cross members 186, 188 cooperate to transmit torque between shafts 182 and 184 while allowing shaft 182, 184 to independently move along the aligned axes 200, 202. Particularly, if shafts 182 and 184 are forced "together" or are axially compressed toward one another (e.g., if a force in the direction of arrow 226 is imparted upon portion 182 and/or a force in the direction of arrow 228 is imparted upon portion 184), links 192, 194 will selectively pivot about axes 208, 218 and 222 and links 196, 198 will selectively pivot about axes 212, 220 and 224, thereby respectively causing each link pair 192, 194 and 196, 198 to "fold" or to "collapse", thereby cooperatively causing assembly 190 to enter or occupy a "collapsed position" or "state". As each link pair selectively "collapses", portions 182, 184 move together (e.g., toward one another) along the respective and aligned axes 200, 202 (e.g., portion 182 moves in the direction of arrow 226 and/or portion 184 moves in the direction of arrow 228). If portions 182 and 184 are forced "apart" or away from one another, links pairs 192, 194 and 196, 198 will selectively "unfold" or "expand", thereby causing assembly 190 to or enter an "expanded position" or "state".

As the link pairs selectively "expand", portions 182, 184 move linearly or axially away from one another along their respective and aligned axes 200, 202 (e.g., portion 182 moves in the direction of arrow 226 and/or portion 184 moves in the direction of arrow 228).

When used in a steering assembly application, the entire assembly 180 selectively replaces the conventional telescoping intermediate shaft. Due to the required positional offset of the steering column and gear shaft, conventional universal joints are used to selectively couple assembly 180 to the steering column and to the gear shaft. Once assembly 180 is attached to the steering column and the gear shaft, the selective rotation of the steering column is transferred through assembly 180 to the gear shaft. Assembly lag therefore allows the steering column and the gear shaft to be axially compliant, thereby compensating for relative movement occurring between the vehicle body and vehicle frame while the car is being driven, absorbing and/or reducing the transmission of vibrations from the wheel suspension assembly to the steering column, and allowing the steering column to "collapse" in the event of a collision or accident. Because assembly 180 employs conventional bearings and joints which allow portions 182, 184 to selectively and axially articulate, the need for a conventional telescoping intermediate shaft is obviated. In this manner, assembly 180 substantially eliminates and/or reduces the frictional losses and the susceptibility to contamination and "frictional lock up" associated with the telescoping and engaged surfaces of prior intermediate shafts.

Figure 5:
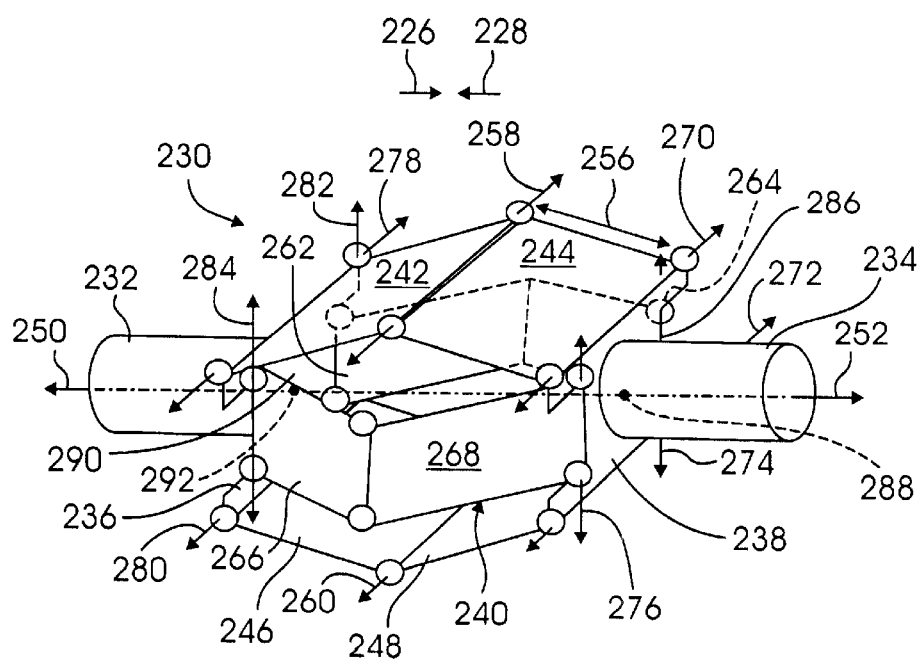
FIG. 5 is a perspective view of a coupling assembly which is made in accordance with the teachings of a fifth embodiment/of the invention.

Referring now to FIG. 5, there is shown a coupling assembly 230 which is made in accordance with the teachings of a fifth embodiment of the invention, and which is adapted to couple shafts or members 232, 234 and to transmit torque or rotational energy between the coupled shafts or members 232 and 234, while concomitantly and selectively allowing the coupled members 232 and 234 to move independently and reciprocally with respect to each other while substantially preventing any relative angular movement between portions 232, 234 (e.g., the respective longitudinal axes of symmetry 250, 252 of members 232, 234 remain aligned or "overlapping" in the manner shown. Assembly 230 may selectively replace a telescoping intermediate shaft within a vehicle steering assembly.

As shown, assembly 230 includes a first substantially "I"-shaped plate member 236 which is fixedly coupled, in a conventional manner, to shaft 232, a second substantially identical plate member 238 which is fixedly coupled in a conventional manner, to shaft 234 and which is substantially parallel to plate member 236, and a connector assembly or member 240 which extends between and is operatively coupled to plate members 236, 238. In the preferred mounting arrangement, the respective longitudinal axes of symmetry 250, 252 of shaft 232, 234 substantially "coincide", "overlap", and are substantially aligned when the shafts 232, 234 are stationary or "at rest", as best shown in FIG. 5.

Member 240 includes two pairs of links, limbs, or members 242, 244 and 246, 248 which are each respectively and substantially identical in structure and function to the previously described members 192, 194, and which each have a substantially uniform and identical edge length 256. Pair 242, 244 and pair 246, 248 are respectively, and pivotally coupled, in a conventional manner, along substantially parallel and coplanar axes 258, 260. Member 240 further includes two pairs of members or links 262, 264; and 266, 268. Member pair 262, 264 and member pair 266, 268 are each substantially identical in structure and function to pair 196, 198, and each have a substantially identical edge length 256 as members 242–248.

Members 242, 246; and members 244, 248 are respectively, and pivotally mounted, in a conventional manner, upon plate members 236 and 238, as illustrated in FIG. by use of a conventional mounting device or member. Members 262, 264 and members 266, 268 are respectively, conventionally, and pivotally mounted upon plate members 236 and 238 by use of a conventional mounting device or member.

Particularly, members 244 and 248 are mounted to plate member 238 in a manner which allows them to respectively pivot about substantially parallel and coplanar axes 270, 272 and members 264 and 268 are mounted to plate member 238 in a manner which allows them to respectively pivot about substantially parallel and coplanar axes 274, 279. Axes 274, 276 are each respectively perpendicular to and coplanar with axes 270, 272. In the preferred embodiment of the invention, the intersecting axes 270, 272 and axes 274, 276 cooperatively define a substantially square area 286 having a center point 288 which substantially coincides with and/or which is resident upon axis 252.

Members 242, 246 and members 262, 266 are respectively mounted to plate member 236 in a substantially identical manner as members 244, 248 and members 264, 268. Particularly, members 242, 246 selectively and respectively pivot about substantially parallel axes 278, 280, and members 262, 268 selectively and respectively pivot about substantially parallel axes 282, 284. Axes 278, 280 are each substantially perpendicular to axes 278, 280. In the preferred embodiment of the invention, the intersecting of axes 278, 280 and axes 282, 284 cooperatively define a substantially square area 290 having a center point 292 which substantially coincides with and/or which is resident upon axis 250.

The previously described mounting arrangement of members 242–248 and members 262–268 and the fixed attachment of shafts 232, 234 to plate members 236, 238 substantially ensures that shafts 232, 234 do not move angularly with respect to one another (e.g., the axes 250, 252 remain operatively aligned in the manner shown). Hence, the movement of portions 232, 234 is limited to the relative axial motion described below. It should further be noted that, unlike member or mounting assembly 190, the previously described mounting arrangement provides for symmetry and inertial balance.

In operation, member 240 and plate members 236, 238 cooperate to transmit torque or rotational energy between portions 232 and 234 while allowing portions 232, 234 to independently and reciprocally move along the aligned axes 250, 252. Particularly, if portions 232 and 234 are compressed or forced "together" (e.g., if a force in the direction of arrow 226 is imparted upon portion 232 and/or a force in the direction of arrow 228 is imparted upon portion 234), members 242–248 and members 262–268 will pivot about their respective pivotal and/or mounting axes 258, 260, 270–284, thereby respectively causing member 240 to selectively "fold", "collapse", or enter into a "collapsed position" or "state". As member 40 selectively "collapses", portions 232, 234 move toward one another along their respective and aligned axes 250, 252 (e.g., portion 232 moves in the direction of arrow 226 and/or portion 234 moves in the direction of arrow 228).

If the members/shafts/portions 232 and 234 are forced "apart" or away from one another, member 240 will selectively "unfold", "expand" or enter into an "expanded position". As member 240 selectively "expands", portions 232, 234 move away from one another along their respective and aligned axes 250, 252 (e.g., portion 232 moves in the direction of arrow 226 and/or portion 234 moves in the direction of arrow 228).

It should be apparent to one of ordinary skill in the art, that assembly 230 may be used within substantially similar applications as assembly 180. For example and without limitation, assembly 230 may be used within a vehicle steering assembly in a substantially identical manner to that previously explained for assembly 180 (i.e., assembly 230 may replace a conventional telescoping intermediate shaft) with substantially similar advantages. Assembly 230 further provides greater stability and strength than assembly 180 due to the additional links (e.g., eight total links) which are coupled to plate members 236, 238 together. Moreover, the inertial symmetry of member 240 allows assembly 230 to be employed in applications requiring inertial balance (e.g., in driveshaft applications).

Figure 6:
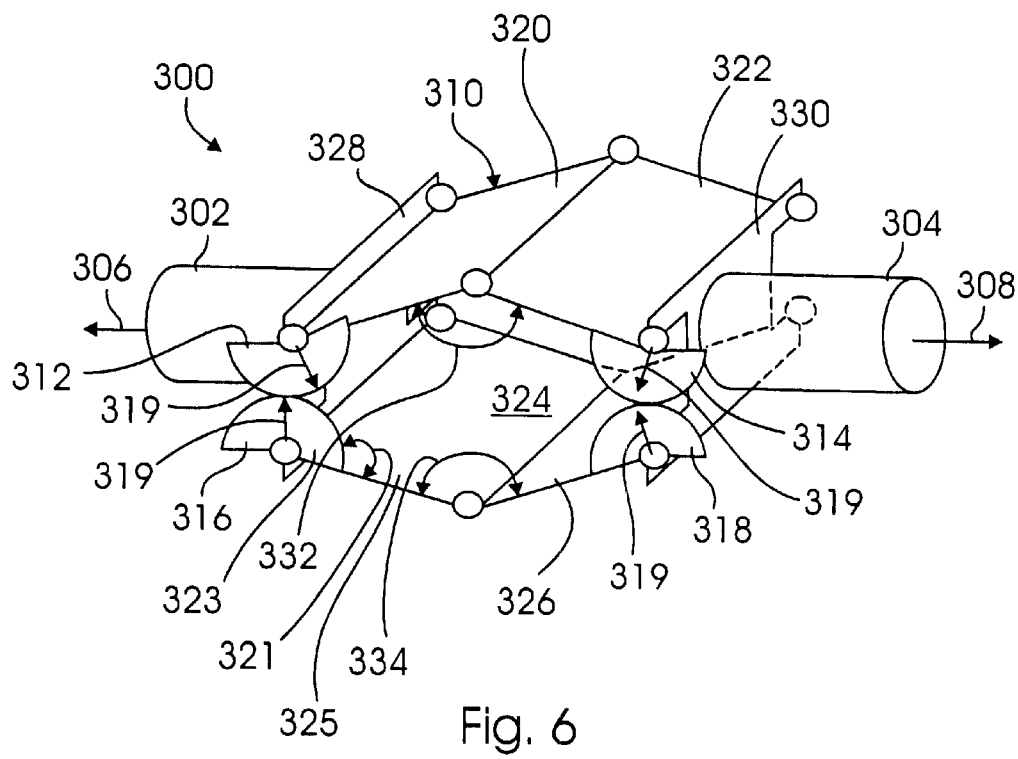
FIG. 6 is a perspective view of a coupling assembly which is made in accordance with the teachings of a sixth embodiment of the invention.

Referring now to FIG. 6, there is shown an assembly 300 for coupling a pair of selectively movable or rotatable members or shafts, which is made in accordance with the teachings of a sixth embodiment of the invention, and which is adapted to transmit torque or rotational energy between the coupled shafts or members 302 and 304 while concomitantly allowing the coupled members 302 and 304 to independently and reciprocally move along the respectively aligned longitudinal axes of symmetry 306, 308. Further, assembly 300 substantially prevents any relative angular movement between portions 302, 304. As previously described with respect to assemblies 180 and 230, assembly 300 may selectively replace a conventional telescoping intermediate shaft within a conventional vehicle steering assembly.

Assembly 300 includes plate members 328, 330 which are substantially identical to plate members 236, 238, and a connecting assembly or member 310 which is substantially identical in structure and function to member 240 with the exception that members 262–268 have been replaced with gears or "gear type" members 312–318 which are respectively and movably/rotatably coupled to members 320–326 in a conventional manner, such as by use of conventional pin 317 and which are substantially identical or similar. Gears 312 and 316 are movably engaged as are gears 314 and 318. Particularly, in one non-limiting embodiment, members 312–318 comprise conventional semi-circular gears having a substantially identical size and radius 319, which is effective provide a substantial "1 to 1 gear ratio" between engaging gear pairs 312, 316 and 314, 318. This "1 to 1 gear ratio" further maintains angular symmetry between members 320–326 (e.g., the angle 332 which is created or exists between members 320, 322 remains substantially identical to the angle 334 which is created or exists between members 324, 326). As shown, gears 312–318, which may be of a wide variety of shapes or configurations, are respectively coupled to members 320, 326 and create and/or form an angle 321 of about ninety degrees between the respective generally flat surface 323 of each gear 312–318 and the generally flat surface 325 of a unique one of the members 320–326 (e.g., each gear 312–318 forms this right angle 321 with the surface 325 of the member 320–326 on and/or to which is selectively coupled). In this manner, it should be appreciated that members 320–326 cooperate with the engaged gears 312–318 to substantially prevent the relative angular movement or relative angular displacement of the coupled shafts 302 and 304.

In operation, member 310 and plate members 328, 330 cooperate to transmit torque or rotational energy between portions 302 and 304 while allowing portions 302, 304 to independently articulate along the aligned axes 306, 308. Particularly, the selectively engaged gears 314–318 cooperate with the pivotally coupled members 320–326 to allow member 310 to selectively "collapse" and "expand" in a substantially identical manner as member 240, thereby allowing portions 302, 304 to respectively and independently move toward and away from each other.

It should be apparent to one of ordinary skill in the art that assembly 300 can be used in substantially similar applications as assembly 230, with the exception of those requiring inertial balance. Particularly, because gears 312–318 are disposed on only one side of plate members 328, 330, inertial balance along the aligned axes of symmetry 306, 209 of shaft 202, 304 is not achieved (e.g., the center of gravity of the assembly 310 does not substantially lie along axes 306, 308). It should be understood however, that inertial balance can be achieved in alternate embodiments by disposing an additional and substantially identical set of four gears on opposite sides of plate members 320–326. Assembly 300 also provides certain advantages over assembly 230. For example and without limitation, by replacing members 262–268 with gears 312–318, assembly 300 selectively expands and contracts in a "smoother" or more consistent fashion, and within a smaller area, space or volume.

Figure 7:
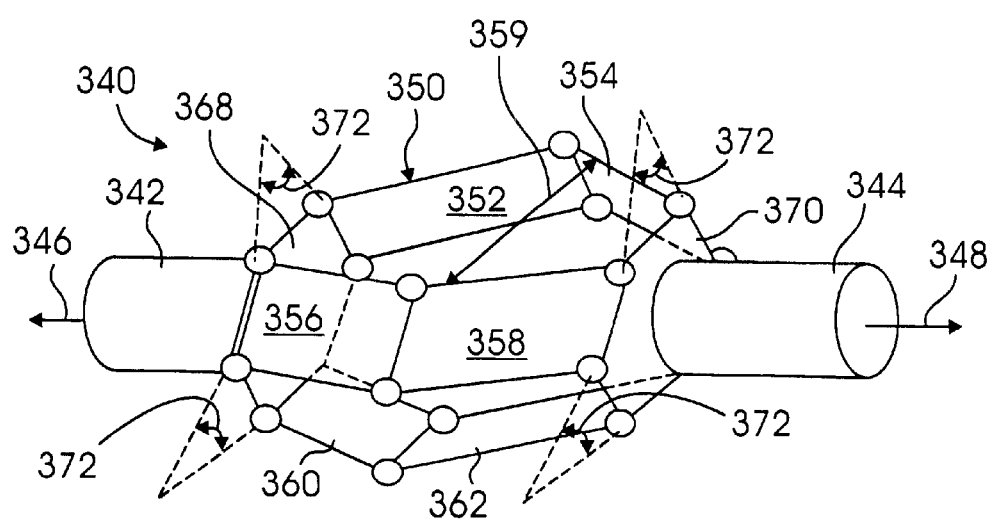
FIG. 7 is a perspective view of a coupling assembly which is made in accordance with the teachings of a seventh embodiment of the invention.

Referring now to FIG. 7, there is shown a coupling assembly 340 which selectively couples two selectively rotatable shafts or members 342, 344, which is made in accordance with the teachings of a seventh embodiment of the invention, and which is adapted to transmit torque or rotational energy between the coupled shaft segments, portions or members 342 and 344 and to concomitantly and selectively allow the coupled members 342 and 344 to reciprocatively move along the aligned and respective longitudinal axes of symmetry 346, 348. Further, assembly 340 substantially prevents any relative angular movement between the coupled shafts 342, 344. As previously described with respect to assemblies 180, 230 and 300, assembly 340 may selectively replace a conventional telescoping intermediate shaft within a conventional vehicle steering assembly.

As shown, assembly 340 includes substantially hexagonal shaped plate members 368, 370 which are respectively and fixedly coupled to shafts 342, 344 in a conventional manner and which are positioned in a parallel manner. Assembly 340 further includes a connector assembly or member 350 which is substantially identical in structure and function to member 240 with the exception that member 350 includes six members or links 352–262 rather than eight. Particularly, links 352–362 are substantially identical and are operatively arranged to cooperatively provide three pairs of joined link segments (i.e., members 352, 354; members 356, 358; and members 360, 362 each form a separate link segment). As shown in FIG. 7, members 354, 358, and 362 are mounted on alternate edges of plate 370 while members 352, 356 and 360 are mounted on alternate edges of plate 368. Each pair of members 352, 354; 356, 358; and 360, 362 is separated by a substantially equal distance 359, and an angle 372 of approximately sixty degrees exists between each adjacent edge of each plate 368, 370 which mountably supports a unique and respective member 352–362. In this manner, it should be appreciated that members 352–362 cooperate to prevent the relative angular movement or angular displacement of portions 342 and 344.

In operation, member 350 and plate members 368, 370 cooperate to transmit torque or rotational energy between coupled shafts or members 342 and 344 while allowing members 342, 344 to selectively, independently and reciprocally move along the aligned axes 346, 348. Particularly, member 350 selectively "collapses" and "expands" in a substantially identical manner as member 240, thereby allowing portions 342, 344 to respectively move toward and away from each other along axes 346, 348.

It should be apparent to one of ordinary skill in the art that assembly 340 can be used within substantially similar applications as assembly 230, including those requiring inertial balance (e.g., driveshaft applications). Particularly, because the substantially identical members 352–362 are symmetrically disposed about the coupled and axially aligned shafts 342, 344, assembly 340 is inertially balanced along the coinciding longitudinal axes of symmetry 346, 348 of portions 342, 344 (e.g., the center of gravity of member 350 substantially lies along the aligned axes 346, 348). Assembly 340 also provides certain advantages over assembly 230. For example and without limitation, by using six joined members rather than eight joined members, assembly 340 has less weight than assembly 230, and is able to "expand" and "contract" within a relatively smaller amount of space or volume.

Figure 8:
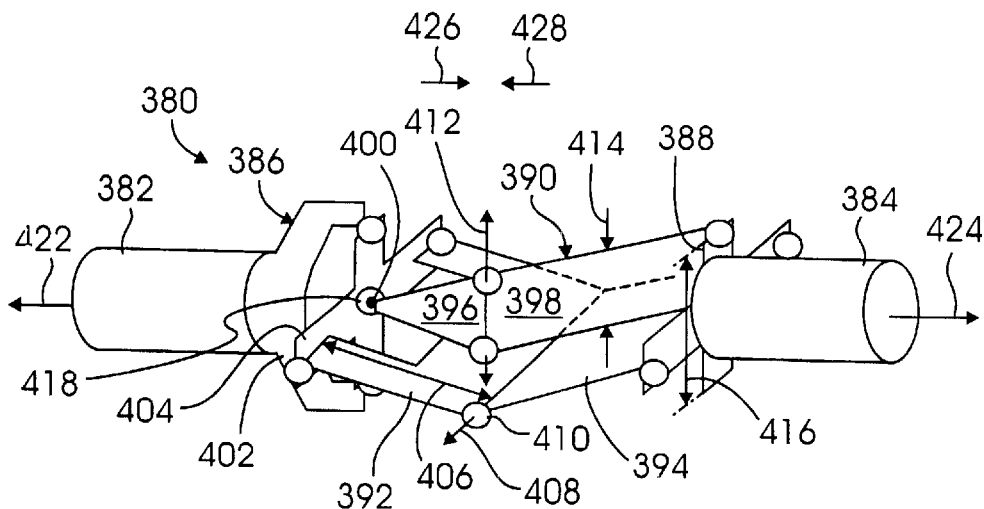
FIG. 8 is a perspective view of a coupling assembly which is made in accordance with the teachings of an eighth embodiment of the invention.

Referring now to FIG. 8, there is shown an assembly 380 which is made in accordance with the teachings of an eighth embodiment of the invention, which is adapted to couple a pair of shafts or members 382, 384 and to transmit torque or rotational energy between the coupled shafts segments, portions or members 382 and 384, while selectively and concomitantly allowing the coupled members 382 and 384 to independently, selectively and reciprocally move with respect to each other along the aligned and respective longitudinal axes of symmetry 422, 424. Assembly 380 further allows members 382, 384 to independently and selectively move with respect to each other about a single point 400 located in relative close proximity to shaft 382. As shown, assembly 380 includes a conventional universal joint 386 which includes a yoke member 402 and a cross joint 404 and which is coupled to shaft 382 by a conventional method or assembly, a cross member 388 which is fixedly coupled to portion 384 in a conventional manner, and a connecting assembly or member 390 which extends between and is operatively coupled to universal joint 386, and to cross member 388.

Member 390 includes a first pair of links, limbs, or members 392, 394 which are substantially identical in structure and function as members 34, 36 with the exception that member 392 is substantially "C"-shaped. Links 392, 394 are conventionally and pivotally coupled along an axis 408 by at least one conventional hinge or joint member 410. Links 396, 398 are pivotally coupled along axis 412 in a conventional manner, such as by use of a hinge or joint member 410, and axis 412 is substantially perpendicular to axis 408. Member 398 is substantially rectangular in shape and member 396 is substantially triangular in shape, and more particularly is of a right triangular shape. It should be appreciated that in other embodiments, members 392–398 can be of any other suitable shape. Members 392, 394, and 398 each have a substantially identical length 406.

Links 396, 398 further have a "height" 414 which is substantially equal to one half of the "height" 416 of cross members 188. Links 392, 394 and links 396, 398 are pivotally and respectively mounted upon cross joint 404 and cross member 388 in a conventional manner, as illustrated in FIG. 8. Particularly, link 398 is pivotally mounted to cross member 388, and link 396 is rotatably mounted to a conventional spherical joint 418 which is approximately and/or substantially disposed upon the center of symmetry 400 of cross joint 404. In this manner, it should be appreciated that shafts 382, 384 selectively and respectively pivot about a single point 400.

In operation, member 390, universal joint 386 and cross member 388 cooperate to selectively transmit torque and rotational energy between the coupled shafts 382 and 384 while allowing the shafts 382, 384 to concomitantly articulate with respect to each other. Particularly, if portions 382 and 384 are forced "together" or moved axially toward one another (e.g., if a force in the direction of arrow 426 is imparted upon portion 382 and/or a force in the direction of arrow 428 is imparted upon portion 384), members 392, 394 and members 396, 398 will pivot about their respective pivotal axes (e.g., axes 408, 412), thereby respectively causing each link pair 392, 394 and 396, 398 to selectively "fold", "collapse", thereby cooperatively causing assembly/ member 390 to enter a "collapsed position" or a "collapsed state". As each link pair 392, 394 and 396, 398 selectively "collapses", shafts 382, 384 move toward one another along their respective and aligned axes 422, 424. If portions 382 and 384 are forced "apart" or away from one another, links pairs 392, 394 and 396, 398 will selectively "unfold", "expand", thereby causing assembly/member 390 to enter an "expanded position". As the link pairs 392, 394 and 396, 398 selectively "expand", portions 382, 384 move away from one another along their respective and aligned axes 422, 424. Shafts 382, 384 may also respectively, concomitantly and independently pivot about point 400. It should be appreciated that as shafts 382, 384 pivot about point 400, cross joint 404 and cross member 388 remain in a substantially parallel relationship to each other.

It should be apparent to one of ordinary skill in the art that, when used in a steering assembly application, member 390, cross member 388, and shaft 384 cooperatively replace the conventional telescoping intermediate shaft. Particularly, assembly 380 allows the steering column and gear shaft to be axially compliant, thereby compensating for relative movement occurring between the vehicle body and vehicle frame while the car is being driven, absorbing and/or reducing the transmission of vibrations from the wheel suspension assembly to the steering column, and allowing the steering column to "collapse" in the event of a collision or accident. It should further be understood that like assembly 180, assembly 380 substantially eliminates and/or reduces frictional losses and susceptibility to contamination associated with the telescoping surfaces of prior intermediate shafts.

Figure 9:
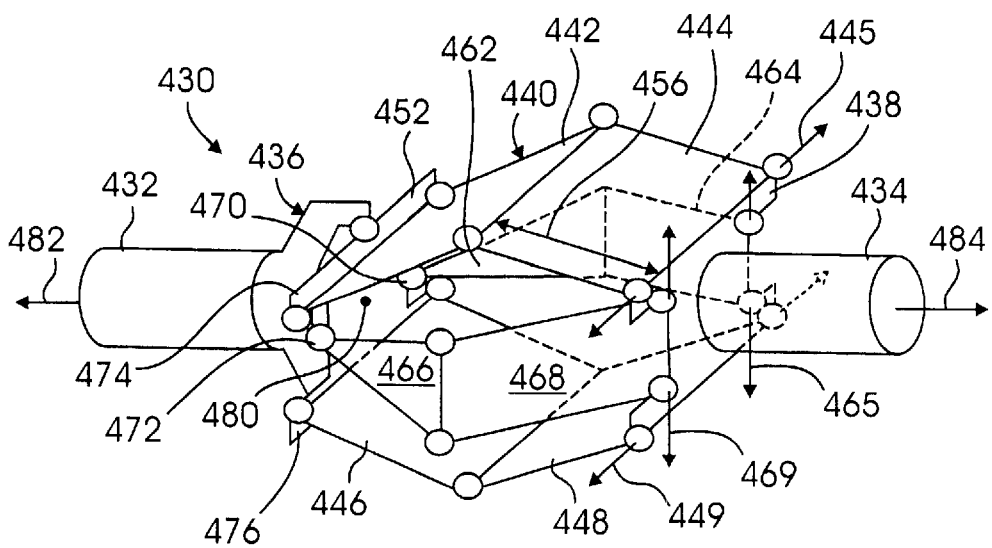
FIG. 9 is a perspective view of a coupling assembly which is made in accordance with the teachings of a ninth embodiment of the invention.

Referring now to FIG. 9, there is shown a coupling assembly 430 which is made in accordance with the teachings of a ninth embodiment of the invention, which is adapted to couple shafts or members 432, 434, to transmit torque or rotational energy between coupled shafts or members 432 and 434, and which selectively allows members 432 and 434 to selectively, reciprocally and independently move with respect to each other along the aligned longitudinal axes of symmetry 482, 484, and to independently pivot about a single point 480 which is located in relative close proximity to shaft 432.

As shown, assembly 430 includes a conventional universal joint 436 which is coupled to shaft 432 in a conventional manner and which has a substantially "I"-shaped joint member 452. Assembly 440 further includes a substantially "I"-shaped plate member 438 which is conventionally and fixedly coupled to shaft 434, and a connecting assembly or member 440 which extends between and is operatively coupled to universal joint 436 and plate member 438.

Member 440 includes two pairs of substantially identical links and/or similar links, limbs, or members 442, 444; and 446, 448 which are each respectively and substantially identical in structure and function to the previously described link or member pair 392, 394. Member 440 further includes two pairs of substantially identical members 462, 464; and 466, 468 which are each substantially identical in structure and function to link or member pair 396, 398. Members 462–468 and members 442–448 each have a substantially identical edge length 456.

Members 442–448 and members 462–468 are pivotally mounted in a conventional manner upon universal joint 436 and plate member 438, as illustrated in FIG. 9. Particularly, members 442–448 and members 464 and 468 are mounted to universal joint 436 and plate member 438 in a substantially similar manner to that previously described for members 392, 394 and member 398. The respective pivotal and/or mounting axes 445, 449 of members 444, 448 are substantially perpendicular to the repective pivotal and/or mounting axes 465, 469 of members 464, 468. Members 462 and 466 are each respectively mounted to a conventional spherical joint 470, 472 located on opposing sides of joint member 452 approximately midway between top edge 474 and bottom edge 476 of member 452.

In this manner, it should be appreciated that members or shafts 432, 434 selectively and respectively pivot about point 480 located in relative proximity to shaft 432 and more particularly in the relative proximity to the center of joint member 452. It should be further appreciated that, unlike assemblies 10, 80 and 130, the previously described mounting configuration substantially allows shafts 432, 434 to rotate only about a single point 480 and not, for example and without limitation, about a second point in relative close proximity to shaft 434.

Assembly 430 operates in a substantially identical manner as the previously described assembly 380. Particularly, in operation, member 440, universal joint 436 and plate member 438 cooperate to transmit torque or rotational energy between shafts 432 and 434 while concomitantly allowing the shafts 432, 434 to independently articulate with respect to each other. In response to the relative axial movement of shafts 432, 434 along the aligned longitudinal axes of symmetry 482, 484, members 442–448 and 462–468 pivot, causing member 440 to "collapse" and "expand", thereby allowing shafts 432, 434 to move toward or away from each other along their respective axes 482, 484. Shafts 432, 424 also selectively and respectively pivot about point 480. It should be appreciated that as shafts 432, 434 pivot about point 480, joint member 452 and plate member 438 remain in a parallel relationship to each other. It should further be appreciated that unlike member 390, the symmetrical and equidistant disposition of members 442–448 and 462–468 upon universal joint 436 and plate member 438 provides for symmetry and inertial balance about the axes of symmetry 482, 484 of portions 432, 434.

It should be apparent to one of ordinary skill in the art, that assembly 430 may be used within substantially similar applications within which assembly 380 may be used. For example and without limitation, assembly 430 may be used within a steering assembly application in a substantially identical manner to that previously described with respect to assembly 380 (i.e., the combination of member 440, plate member 438 and shaft 434 may replace a conventional telescoping intermediate shaft) with substantially similar advantages over a telescoping shaft. Assembly 430 further provides more stability and strength than assembly 380 due to the additional links (e.g., links 442–448 and 462–468) coupling universal joint 436 to plate member 438. Moreover, since member 440 is symmetrically disposed along a longitudinal axis of symmetry 487 which is aligned with the axes 482, 484, assembly 420 is inertially balanced and may be employed in applications requiring such inertial balance, such as in vehicle driveshaft applications.

Figure 10:
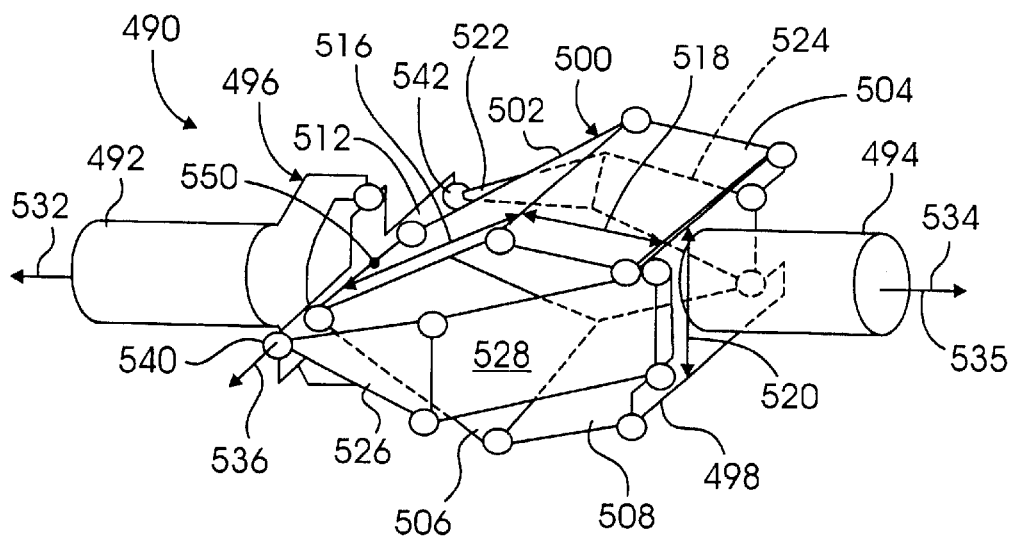
FIG. 10 is a perspective view of a coupling assembly which is made in accordance with the teachings of a tenth embodiment of the invention.

Referring now to FIG. 10, there is shown a coupling assembly 490 for coupling two selectively rotatable members or shafts 492, 494, which is made in accordance with the teachings of a tenth embodiment of the invention, and which is adapted to transmit torque or rotational energy between the coupled members or shafts 492, 494, and to selectively allow members 492 and 494 to independently articulate with respect to each other. Assembly 490 is substantially similar in structure and function to the previously described assembly 430, with the exception that "I"-shaped joint member 452 has been replaced with a cross member 512. Members 502–508 and members 522–528 are respectively and substantially similar in function and structure to members 442–448 and members 462–468, except that members 502–508 and 522–528 do not have identical lengths. Rather, the length 516 of members 502, 506, 522, 526 is substantially different from the length 518 of members 504, 508, 524, 528. Particularly, length 516 is substantially equal to the summation of the length 518 plus one half of the length 520 of plate member 498.

As shown in FIG. 10, assembly 490 includes a universal joint 496 and plate member 498, which are respectively and fixedly coupled to shafts 492, 494 in a known and conventional manner, and a connecting assembly or member 500 which is substantially identical in structure and function to member 440 except as specifically described below.

Members 502 and 506 are pivotally mounted upon the universal joint 496 and members 504, 508 are respectively and pivotally mounted upon plate member 498 in a conventional manner, are respectively and pivotally mounted to members 502, 506 which cooperatively form a longitudinal axis of symmetry 535, and cooperate with members 502, 506 to form an assembly which is symmetric about the longitudinal axes of symmetry 532, 534. Members 524, 528 are pivotally mounted upon plate member 498 in a substantially conventional manner, while members 522, 526 are pivotally mounted upon universal joint 496 and to respective members 524, 528 in a known manner. Members 522–528 cooperatively form an assembly which is also substantially symmetric about the longitudinal axis of symmetry 535. Moreover, as shown, members 502, 506 are pivotally mounted upon cross joint 512 along substantially the same axis 536 while members 504, 508 and 524, 528 are mounted to plate member 498 in a substantially similar manner as described with respect to members 444, 448 and members 464, 468 (e.g., the respective mounting axes of members 504, 508 are substantially perpendicular to the respective mounting axes of members 524, 528). Members 522 and 526 are each respectively mounted to a conventional spherical joint 540, 542 which is operatively located on opposing sides of joint member 512 and along axis 536.

In this manner, it should be appreciated that shafts 492, 494 are "free" to respectively and selectively pivot about the point 550 which is located in relative close proximity to shaft 492, and more particularly in the relative close proximity to the center of cross joint 512. It should be further appreciated that, like assembly 430, the perpendicular relationship between the mounting axes of links 504, 508 and links 524, 528 and the lack of any universal joint attachment to plate member 498 substantially allows shafts 492, 494 to rotate only about the point 550 and, without limitation, prevents shafts 492, 494 from substantially rotating about a second point in relative close proximity to shaft 494.

As such, assembly 490 operates in a substantially identical manner as assembly 430. Particularly, in operation, member 500, universal joint 496 and plate member 498 cooperate to transmit torque or rotational energy between shafts 492 and 494 while allowing shafts 492, 494 to independently articulate with respect to each other. In response to the relative axial movement of shafts 492, 494, members 502–508 and 522–528 pivot, thereby causing member 500 to selectively "collapse" and "expand", thereby allowing shafts 492, 494 to move linearly or axially toward or away from each other along the longitudinal axis of symmetry 535. Shafts 492, 494 are also free to respectively pivot about point 550. It should be appreciated that as shafts 492, 494 pivot about point 550, cross joint 512 and plate member 498 remain in a substantially parallel relationship to each other. The symmetrical and equidistant disposition of members 502–508 and 522–528 upon universal joint 496 and plate member 498 provides symmetry and inertial balance about the axes of symmetry 532, 534 of shafts 492, 494.

It should be apparent to one of ordinary skill in the art that assembly 490 can be used in substantially similar applications as assembly 430, including those requiring inertial balance (e.g., driveshaft applications). Particularly, because members 502–508 are symmetrically disposed upon cross member 512 and plate member 498, assembly 490 is inertially balanced along the coinciding axes of symmetry 532, 534 of portions 492, 494 (e.g., the center of gravity of member 500 substantially lies along axes 492, 494). Assembly 490 also provides certain advantages over assembly 430. For example and without limitation, because members 502, 506, 522, and 526 are all coupled along an identical axis 536, shafts 492, 494 have a greater range of motion than shafts 432, 434 of assembly 430.

Figure 11:
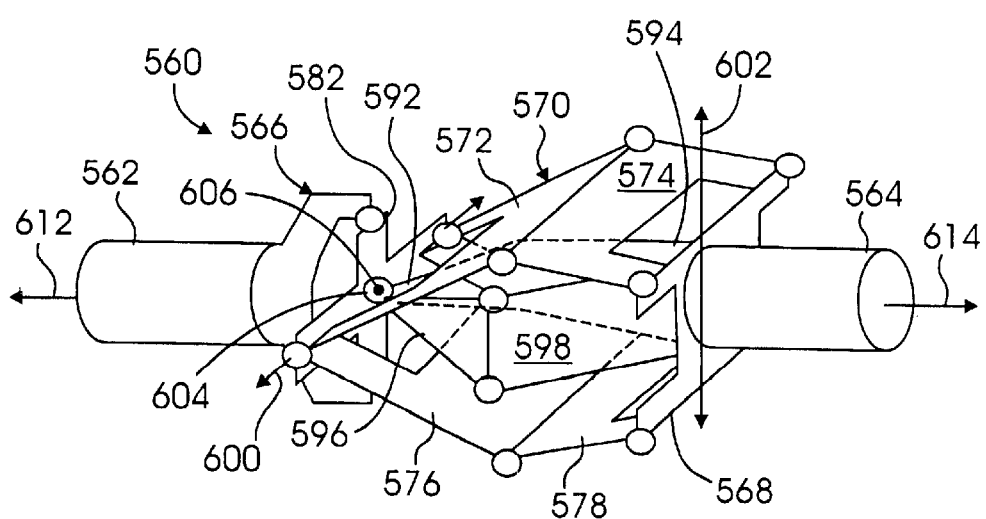
FIG. 11 is a perspective view of a coupling assembly which is made in accordance with the teachings of a eleventh embodiment of the invention.

Referring now to FIG. 11, there is shown a coupling assembly 560 which is adapted to couple two selectively rotating shafts or members 562, 564, which is made in accordance with the teachings of a eleventh embodiment of the invention, and which is adapted to transmit torque or rotation between members 562 and 564, and to selectively allow members 562 and 564 to independently articulate with respect to each other.

Assembly 560 is substantially similar in structure and function to assembly 490 with the exception that members 592, 596; and 594, 598 are respectively coupled to the center portions of cross joint 582 and to opposed ends of the "I"-shaped plate member 568. Additionally, members 572–578 are respectively substantially similar in function and structure to members 502–508, except that members 502–508 are substantially "C"-shaped to provide clearance for members 592–598 which are pivotally coupled to the central portions of cross joint 582 and member 568. It should be appreciated that in other alternate embodiments, members 592–598 may be of any other suitable shape.

As shown in FIG. 11, assembly 560 includes universal joint 566 and plate member 568, which are respectively and fixedly coupled to shafts 562, 564, and a connecting assembly or member 570 which is substantially identical in structure and function to member 500 except as herein described.

Members 572 and 574 are pivotally coupled in a conventional manner as are members 576, 578. Members 574 578 are pivotally mounted upon plate member 568 in a conventional manner and members 572, 576 are coupled to universal joint 566. Particularly, members 592 and 594 are pivotally coupled in a conventional manner as are members 596, 598. Member 594 and 598 are coupled to plate member 568 in a conventional manner and members 592, 596 are coupled to members of joints 566 in a conventional manner.

More particularly, members 572, 576 are conventionally and pivotally mounted upon cross joint 582 along the substantially same axis 600. Members 574, 578 are mounted to plate member 568 in a substantially similar manner as described for members 504, 508. Members 594, 598 are pivotally coupled to plate member 568 substantially along the longitudinal axis of symmetry 602 of plate member 568. Axis 602 is substantially perpendicular to the axes along which members 574, 578 are mounted upon member 568. Members 592 and 596 are each respectively mounted to a single conventional spherical joint 604 located in relative proximity to the center of symmetry 606 of cross joint 582 and along axis 600.

In this manner, it should be appreciated that shafts 562, 564 are "free" to respectively pivot about a single point 606 which is located in relative proximity to shaft 562 and, more particularly, in the relative close proximity to the center point 606 of cross joint 582.

As such, assembly 560 operates substantially identical to assemblies 430 and 490. Particularly, in operation, member 570, universal joint 566 and plate member 568 cooperate to transmit torque between shafts 562 and 564 while concomitantly allowing shafts 432, 434 to independently articulate. In response to the relative axial movement of shafts 562, 564, members 572–578 and 592–598 pivot, causing member 570 to "collapse" and "expand", thereby allowing shafts 562, 564 move linearly or axially toward or away from each other one another along their respective axes 612, 614. Shafts 562, 564 are also "free" to independently and respectively pivot about point 606. It should be appreciated that as shafts 562, 564 pivot about point 606, cross joint 582 remains in a substantially parallel relationship to plate member 568. It should further be appreciated, that like members 440 and 500, assembly 560 is symmetrical about the aligned axes of symmetry 612, 614, thereby providing for inertial balance.

It should be apparent to one of ordinary skill in the art that assembly 560 can be used in substantially similar applications as assemblies 430 and 490, including applications requiring inertial balance (e.g., driveshaft applications). Assembly 560 also provides certain advantages over assemblies 430, 490. For example and without limitation, the "centering" or central disposition of each of members 592–598 upon cross joint 582 and plate member 568 allows member 570 to expand and contract in a relatively smaller area, space or volume than member 500 and member 420.

Figure 12:
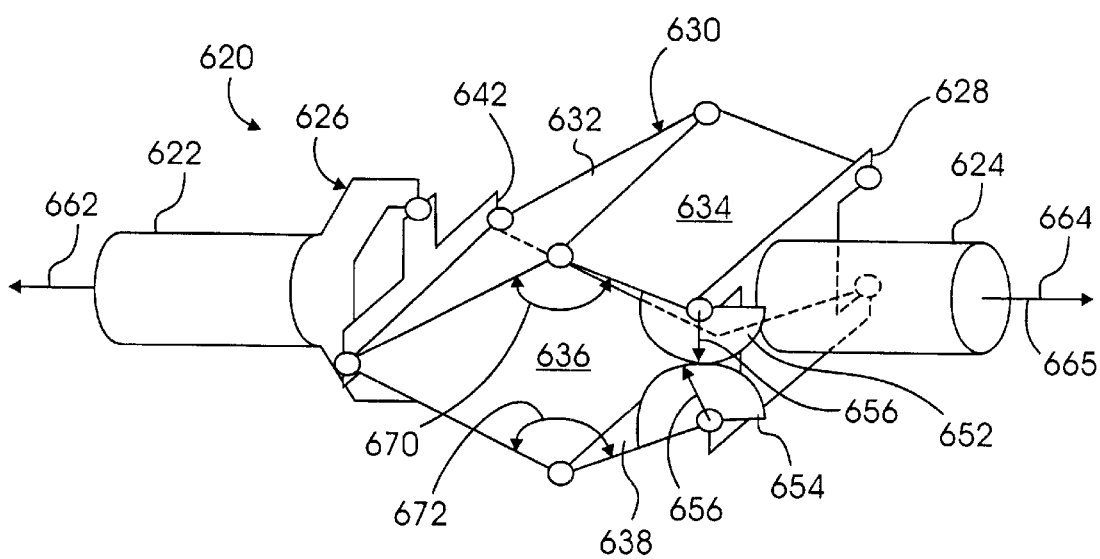
FIG. 12 is a perspective view of a coupling assembly which is made in accordance with the teachings of a twelfth embodiment of the invention.

Referring now to FIG. 12, there is shown a coupling assembly 620 which is made in accordance with the teachings of a twelfth embodiment of the invention, and which is adapted to couple shafts or members 622, 624 and to transmit torque between these coupled shafts or members 622, 624. Moreover, assembly 620 selectively allows members 622 and 624 to independently articulate with respect to each other as the torque or rotational energy is transmitted between the coupled shafts 622, 624. As shown, member 632 and 634 are pivotally coupled in a conventional manner as are members 636, 638. Members 634, 638 are coupled to plate 628 while members 632, 636 are coupled to cross joint 642 which is mounted upon the universal joint 626.

Assembly 620 is substantially similar in structure and function to assembly 490 with the exception that members 522–528 of assembly 490 have been replaced with a pair of selectively engaging semi-spherical gear members 652, 654 which are respectively, operatively, and conventionally coupled to members 634, 638. Particularly, gear members 652, 654 comprise conventional and commercially available gears which of a substantially identical size and radius 656, thereby providing a substantially "1 to 1 gear ratio" between engaging gear pairs 652, 654, and creating and maintaining angular symmetry between members 632–638 (e.g., the angle 670 which is selectively and dynamically created between members 612, 644 remains substantially identical to the angle 672 which is selectively and dynamically created between members 636, 638). The coupled members 632–638 therefore cooperatively form an assembly which is symmetrical about the longitudinal axis of symmetry 665 which is aligned with and/or overlays the respective axes of symmetry 662, 664 of members 622, 624. As shown, gears 652, 654 are rotatably mounted to plate member 620, in a conventional manner such as by the use of at least one pin 639, and are respectively coupled to members 634, 638 in a substantially identical manner as previously described with respect to gear members 314, 318 and members 322, 326.

In operation, member 630, universal joint 626, and plate member 628, cooperate to transmit torque between shafts 622 and 624 while allowing shafts 622, 624 to concomitantly and reciprocally move along axis 665. Member or assembly 630 selectively "collapses" and "expands" in a substantially identical manner as member 500, thereby allowing shafts 622, 624 to respectively move toward and away from each other.

It should be apparent to one of ordinary skill in the art that assembly 620 can be used in substantially similar applications as assembly 490, with the exception of those requiring inertial balance. Particularly, because gears 652, 654 are disposed only on one side of plate member 628, there is substantially no "inertial balance" along the axis of symmetry 665 and along the respective axes 662, 664 of portions 622, 624 (e.g., the center of gravity of assembly 630, does not substantially lie substantially along axes 662, 664). It should be understood however, that inertial balance can be achieved in alternate embodiments by disposing an additional and substantially identical set of two engaging gears on the opposite side of plate member 628. Assembly 620 also provides certain advantages over assembly 490. For example and without limitation, by replacing members 522–528 with gears 652, 654, assembly 620 is able to expand and contract in a "smoother" or more consistent fashion by way of the engagement of gears 652, 654, and can also expand and contract within a relatively smaller area, space, or volume than assembly 490.

Figure 13:
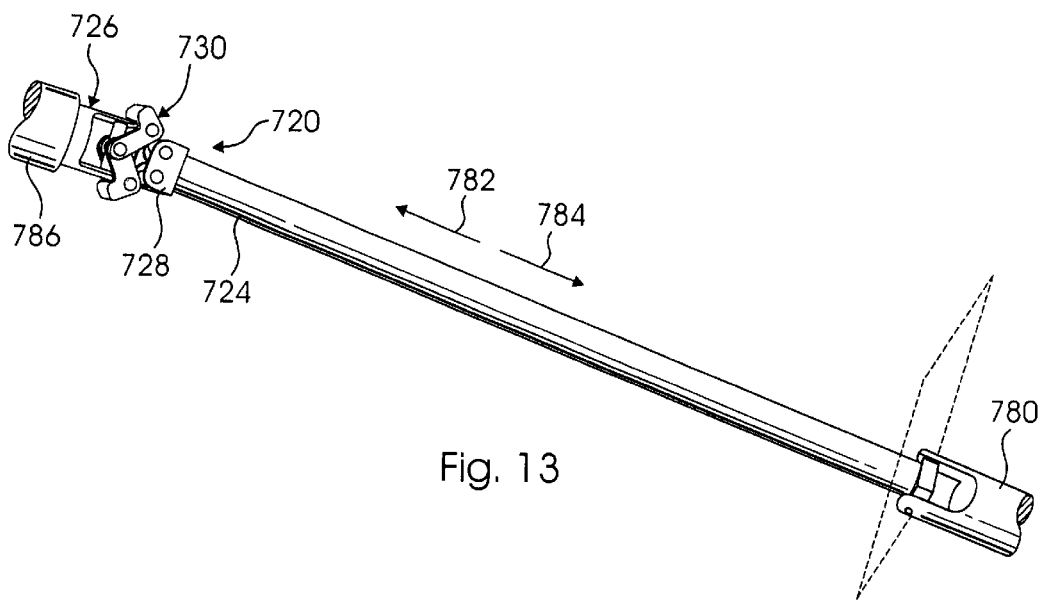
FIG. 13 is a perspective view of a coupling assembly employed within a vehicle steering assembly.
Figure 14:
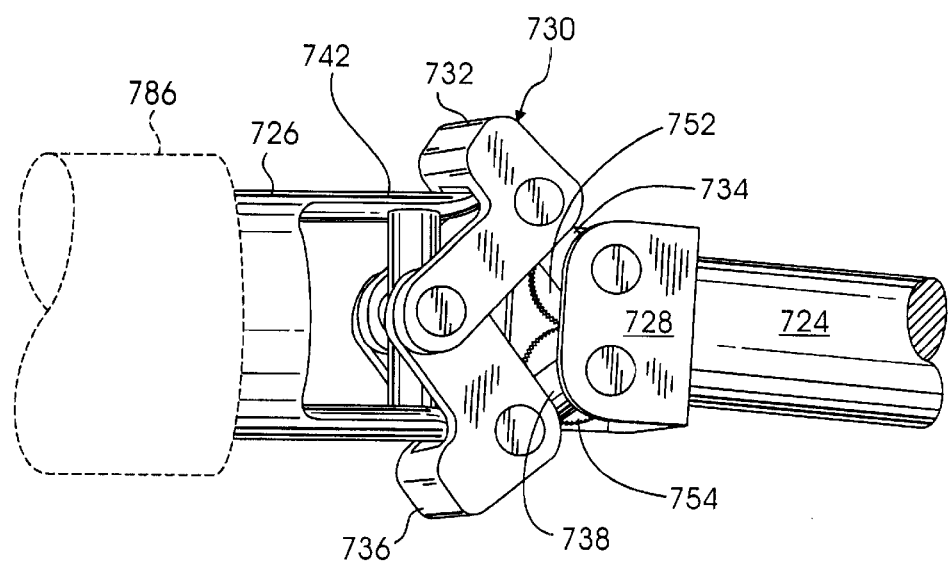
FIG. 14 is an enlarged partial view of the assembly shown in FIG. 13.

An intermediate steering gear shaft application of assembly 620 is illustrated in FIGS. 13–14. Except as otherwise delineated below, gear shaft assembly 720 is substantially identical in structure and function to assembly 620, and assembly 720 includes substantially identical elements/portions/characteristics as assembly 620. Elements having a substantially identical structure and function are defined by the same reference numerals as assembly 620, delineated in FIG. 12, with the exception that elements of assembly 720 have their respective reference numerals incremented by 100.

In operation, universal joint 726 is coupled to a steering column 786 in a conventional manner, and shaft 724 is coupled to a conventional steering rack or wheel suspension assembly (not shown) by way of conventional joint 780. Member 730, universal joint 726 and cross member 728 cooperate to transmit torque from the steering column to the shaft 724 while allowing shaft 724 to articulate axially in the directions illustrated by arrows 782, 784. Particularly, as forces and/or vibrations in the directions of arrows 782, 784 are imparted upon shaft 724 by way of the wheel suspension assembly, shaft 724 moves axially toward and away from steering column 786, thereby absorbing the forces and vibrations imparted upon shaft 724, and preventing such movement/vibration from being translated to the steering column. Specifically, members 732–738 will pivot about their respective pivotal axes, thereby respectively causing each link pair 732, 734 and 736, 738 to "fold" and "unfold" or "collapse" and "extend" and causing the engaged gears to turn. As each link pair "collapses", shaft 724 moves linearly or axially in the direction of arrow 782. As each link pair "extends" shaft 724 moves linearly or axially in the direction of arrow 784. In this manner, assembly 720 substantially reduces, dampens, and/or eliminates the transport of vibration, and movement from the wheel suspension assembly to the steering column 786. The axial movement provided by assembly 720 will also allow the steering column to desirably "collapse" in the event of a collision or accident. Assembly 720 further substantially eliminates and/or reduces frictional losses associated with the telescoping surfaces of prior intermediate shafts, and is substantially less susceptible to "contamination" and "frictional lock up".

It is understood that the invention is not limited by the exact construction or method illustrated and described above but that various changes and/or modifications may be made without departing from the spirit and/or the scope of Applicants' inventions.

What is claimed is:

1. An assembly comprising:
   a first rotating and torque producing shaft having a first longitudinal axis of symmetry;
   a second shaft having a second longitudinal axis of symmetry;
   a first cross-member fixedly coupled to said first rotating shaft;
   a second cross-member fixedly coupled to said second shaft;
   a third member which is pivotally coupled to said first and to said second cross-members and which selectively pivots about a first axis; and
   a fourth member which is pivotally coupled to said first and to said second cross-members and which pivots about a second axis which is substantially perpendicular to said first axis, said third member and said fourth member cooperating to transmit said torque from said first rotating shaft to said second shaft and substantially aligning said first and second longitudinal axes of symmetry of said first and said second shafts while maintaining said alignment as torque is transmitted from said first rotating shaft to said second shaft, said third and said fourth members being movable from a first collapsed position to a second expanded position, thereby allowing said first rotating shaft and said second shaft to independently move along said aligned longitudinal axes of symmetry.

2. The assembly of claim 1 wherein said third member comprises a first pair of pivotally coupled members.

3. The assembly of claim 2 wherein said fourth member comprises a second pair of pivotally coupled members.

4. The assembly of claim 3 wherein said first pair of members are pivotally coupled along said first axis and wherein said second pair of members are pivotally coupled along said second axis which is substantially perpendicular to said first axis.

5. The assembly of claim 3 wherein said first pair of members are pivotally coupled along said first axis and wherein said second pair of members are pivotally coupled along said second axis which is substantially parallel to said first axis.

6. The assembly of claim 3 wherein each of said pivotally coupled members are substantially identical.

7. The assembly of claim 2 wherein said third member comprises a pair of gear members which are coupled to said fourth member.

* * * * *